(12) United States Patent
Takahashi (10) Patent No.: US 11,404,741 B2
(45) Date of Patent: Aug. 2, 2022

(54) BATTERY SYSTEM HAVING WATERPROOF STRUCTURE

(71) Applicant: SANYO Electric Co., Ltd., Daito (JP)

(72) Inventor: Hiroyuki Takahashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 377 days.

(21) Appl. No.: 16/467,826

(22) PCT Filed: Nov. 22, 2017

(86) PCT No.: PCT/JP2017/041976
§ 371 (c)(1),
(2) Date: Jun. 7, 2019

(87) PCT Pub. No.: WO2018/110231
PCT Pub. Date: Jun. 21, 2018

(65) Prior Publication Data
US 2021/0328299 A1    Oct. 21, 2021

(30) Foreign Application Priority Data
Dec. 16, 2016  (JP) .............................. JP2016-244829

(51) Int. Cl.
*H01M 50/24* (2021.01)
*H01M 50/543* (2021.01)
(Continued)

(52) U.S. Cl.
CPC ......... *H01M 50/24* (2021.01); *H01M 50/172* (2021.01); *H01M 50/213* (2021.01); *H01M 50/543* (2021.01); *H01M 2220/20* (2013.01)

(58) Field of Classification Search
None
See application file for complete search history.

(56) References Cited

U.S. PATENT DOCUMENTS

| 6,737,192 B2* | 5/2004 | Yabuki ................ H01M 50/543 429/178 |
| 2012/0040234 A1 | 2/2012 | Amagai et al. |

(Continued)

FOREIGN PATENT DOCUMENTS

| CN | 105164830 A | 12/2015 |
| EP | 2 355 205 A1 | 8/2011 |

(Continued)

OTHER PUBLICATIONS

English Translation of Search Report dated Apr. 13, 2022, issued in counterpart CN Application No. 201780075582.1 (2 pages).

*Primary Examiner* — Ula C Ruddock
*Assistant Examiner* — Anna Korovina
(74) *Attorney, Agent, or Firm* — WHDA, LLP (57) ABSTRACT

In a battery system, an output lead is exposed at an opening of an outer case, and the outer case accommodates a cradle mounting a lead plate and disposed at a fixed position. The cradle includes an upper plate allowing the lead plate to be disposed on the upper plate, a peripheral wall disposed around the lead plate, a drainage hole opened in the upper plate, and a drainage channel for water flowing from the drainage hole. The outer case is provided with a drainage opening allowing water flowing from the drainage channel to be externally drained. The lead plate includes a planar part disposed inside the peripheral wall, and a rising part crossing over the peripheral wall. Entering water flowing from the opening flows from the drainage hole and passes through the drainage channel to be externally drained out of the drainage opening of the outer case.

7 Claims, 7 Drawing Sheets

(51) Int. Cl.
 *H01M 50/213* (2021.01)
 *H01M 50/172* (2021.01)

(56) References Cited

U.S. PATENT DOCUMENTS

| | | |
|---|---|---|
| 2014/0242427 A1 | 8/2014 | Tanaka et al. |
| 2015/0147613 A1 | 5/2015 | Hayashida et al. |
| 2016/0111702 A1 | 4/2016 | Ohsumi et al. |
| 2016/0372736 A1* | 12/2016 | Kim .................... H01M 50/543 |
| 2018/0013125 A1 | 1/2018 | Hattori et al. |

FOREIGN PATENT DOCUMENTS

| | | |
|---|---|---|
| JP | 2006-035941 A | 2/2006 |
| JP | 2010-287568 A | 12/2010 |
| JP | 2011-103259 A | 5/2011 |
| JP | 2011-154883 A | 8/2011 |
| JP | 2014-32896 A | 2/2014 |
| JP | 2014-165102 A | 9/2014 |
| JP | 2015-153741 A | 8/2015 |
| WO | 2013/179798 A1 | 12/2013 |
| WO | 2014/208020 A1 | 12/2014 |
| WO | WO-2015186911 A1 * | 12/2015 .......... H01M 50/502 |
| WO | 2016/136249 A1 | 9/2016 |

* cited by examiner

BATTERY SYSTEM HAVING WATERPROOF STRUCTURE

TECHNICAL FIELD

The present invention relates to a battery system incorporating a secondary battery, and particularly relates to a battery system having a waterproof structure optimal for a vehicle.

BACKGROUND ART

A battery system needs to have a waterproof structure depending on application. A battery system mounted on a vehicle may be possibly damaged by water under any use environment and thus needs to include an outer case having a waterproof structure. Water entering the outer case will have various harmful effects such as corrosion, an electric leakage, a short circuit, and electronic circuit malfunction.

There has been developed a battery system including an outer case having a sealed waterproof structure in order for prevention of such harmful effects of entering water (see PTL 1 and PTL 2). PTL 1 discloses a battery system including an outer case provided with packing to be watertightly sealed, whereas PTL 2 discloses a battery system including a connector provided with packing to be watertightly fixed to an outer case. In a battery system including a completely sealed outer case, packing may have aged deterioration to defectively allow entry of water. Furthermore, opening and closing the outer case needs time and effort during maintenance work. Particularly, the outer case once opened may not be completely sealed again to allow entry of water.

The battery system includes an output lead that is configured to externally output electric power and charge an incorporated secondary battery and is exposed to outside. The output lead connects a lead wire and a lead plate inside the outer case, and is thus difficult to be watertightly fixed to the outer case. The lead wire and the lead plate connected to the output lead are embodied by a thick lead wire and a thick metal plate having large rated current and being least flexible. In order to solve these problems, the battery system according to PTL 2 watertightly fixes the connector including an output lead to the outer case being sealed.

CITATION LIST

Patent Literatures

PTL 1: Unexamined Japanese Patent Publication No. 2011-103259
PTL 2: Unexamined Japanese Patent Publication No. 2006-035941

SUMMARY OF THE INVENTION

Technical Problems

A battery system including a watertightly sealed outer case defectively needs time and effort for assembly work and maintenance work. A battery system including a connector watertightly fixed to an outer case needs a complicated connector attachment structure, and is defectively difficult to inhibit harmful effects of entry of water for a long period of time because deteriorated packing allows entry of water.

The present invention has been developed to solve these defects of a battery system having a conventional waterproof structure, and has a significant object to provide a battery system having a waterproof structure allowing an outer case to be easily assembled and preventing harmful effects of entry of water for a long period of time.

The present invention provides a battery system having a waterproof structure, the battery system including: an outer case being closed but not being sealed; a secondary battery disposed in the outer case; a lead plate provided in the outer case and connected to an output end of the secondary battery; and an output lead having a first end connected to the lead plate and exposed to outside from an opening of the outer case. The outer case accommodates a cradle for the lead plate disposed on the cradle. The cradle includes an upper plate allowing the lead plate to be disposed on the upper plate, a peripheral wall provided around the upper plate, a drainage hole opened in the upper plate, and a drainage channel for entering water flowing into the drainage hole. The outer case has a drainage opening allowing entering water drained out of the drainage channel of the cradle to be externally drained. The lead plate has a planar part serving as the upper plate of the cradle and disposed inside the peripheral wall, and a rising part provided continuously from the planar part and shaped to cross over the peripheral wall. In the battery system thus configured, entering water flowing through the opening of the outer case flows from the drainage hole of the cradle and passes through the drainage channel to be externally drained from the drainage opening of the outer case.

In the battery system having the waterproof structure according to the present invention, the outer case may include an upper case exposing the output lead and a lower case coupled to the upper case. The lower case may have a coupling part disposing the cradle at a fixed position, the coupling part may have a bottom surface provided with a drainage opening, and the drainage opening may have a waterproof wall surrounding the drainage opening.

In the battery system having the waterproof structure according to the present invention, the lead plate may have a bent board inserted to the drainage hole. The output lead may include a rod inserted to the lead plate and a flange provided at a lower end of the rod, the lead plate may have an insertion hole receiving the rod, the rod may be inserted to the insertion hole of the lead plate, and the lead plate may be disposed on the flange to be connected to the output lead. In the battery system thus configured, the flange may have a noncircular outer shape as a polygonal shape or an elliptical shape, the cradle may have a fitting recess unrotatably guiding the flange having the noncircular shape, the rod may have a surface provided with a screw having a male thread, and the screw may receive a nut connecting a lead wire to the output lead.

In the battery system having the waterproof structure according to the present invention, the lead plate may be an elongated metal plate having a distal end provided with a bent board and an intermediate portion provided with a rising part, the bent board may be inserted to the drainage hole, and the lead plate may have a rear end provided behind the rising part and connected to the output end of the secondary battery.

The battery system having the waterproof structure according to the present invention achieves excellent features of facilitated assembly of the outer case as well as prevention of harmful effects of entry of water for a long period of time. Instead of inhibiting entry of water by sealing the outer case with use of packing or the like, the battery system provides the opening to the outer case in order to expose the output lead and the lead plate at the opening, and externally drains water entering the opening using the cradle provided in the outer case without leaking the water into the outer case by means of a unique structure.

Specifically, in the battery system according to the present invention, the cradle for the lead plate is disposed inside the outer case, and the lead plate is disposed on the cradle. The cradle includes the upper plate allowing the lead plate to be disposed on the upper plate, the peripheral wall surrounding the upper plate, the drainage hole opened in the upper plate, and the drainage channel for entering water flowing into the drainage hole. The outer case has the drainage opening allowing the entering water drained from the drainage channel in the cradle to be externally drained. The lead plate has the planar part serving as the upper plate of the cradle and disposed inside the peripheral wall, and the rising part provided continuously from the planar part and shaped to cross over the peripheral wall. Entering water flowing from the opening of the outer case flows into the drainage channel from the drainage hole of the cradle receiving the lead plate, and the entering water flowing from the drainage channel is externally drained from the drainage opening of the outer case. Water flowing from the opening is externally drained without leaking into the outer case with use of the cradle to inhibit the entering water from leaking into the outer case. The battery system thus configured does not include a conventional outer case sealed by means of packing or the like, and maintains an excellent waterproof structure for a long period of time without deterioration in waterproof effect due to deterioration of the packing. Furthermore, the waterproof structure is stably kept even in a use environment under a severe external condition of temperature or the like.

DESCRIPTION OF EMBODIMENT

An implementation example of the present invention will be described below with reference to the drawings. The following implementation example exemplifies a battery system having a waterproof structure for achievement of the technical idea of the present invention, and the present invention will not limit the battery system having the waterproof structure in terms of configurations or materials to be exemplarily described hereinafter.

For better comprehension of the claims, the present application adds reference marks of members appearing in the implementation example to members appearing in "Claims" and "Solution to problems". The members appearing in the claims should never be limited to the members appearing in the implementation example.

The battery system having the waterproof structure according to the present invention is utilized as a power source mounted on a vehicle or variously applied with a demand for a feature inhibiting harmful effects of entry of water. The following implementation example describes in detail a battery system parallelly connected to a vehicle electrical equipment battery, although the present invention will not limit the battery system to the following application. A vehicle battery system is particularly applicable as a battery system utilized as a power source configured to supply a vehicle drive motor with electric power. The following battery system parallelly connected to the electrical equipment battery may have an output voltage set to 12 V or the like equal to a voltage of the electrical equipment battery. The battery system configured to supply the drive motor with electric power may include a large number of secondary batteries connected in series to have an output voltage of 100 V to 400 V or the like.

Figure 1:
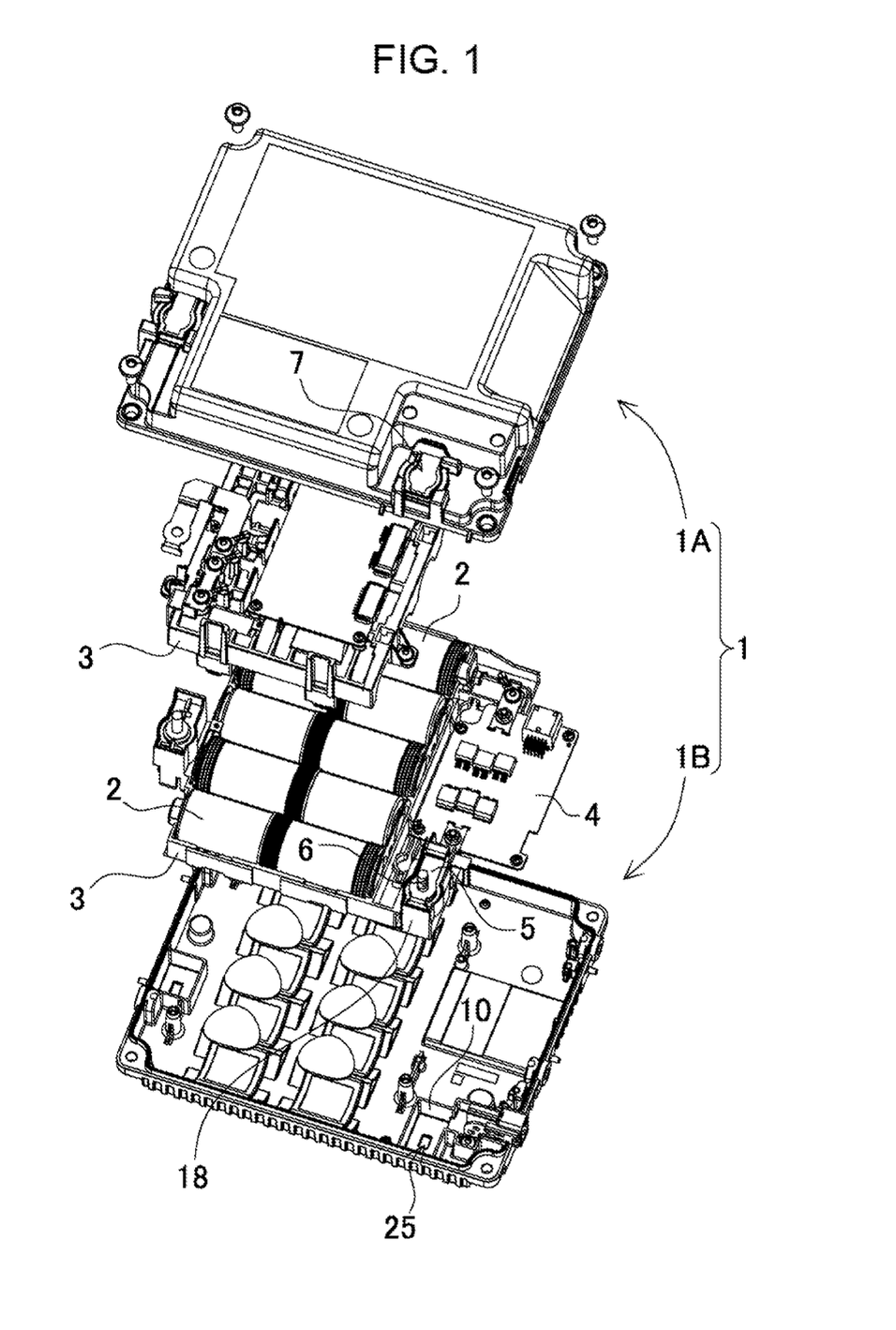
FIG. 1 is an exploded perspective view of a battery system according to an implementation example of the present invention.
Figure 2:
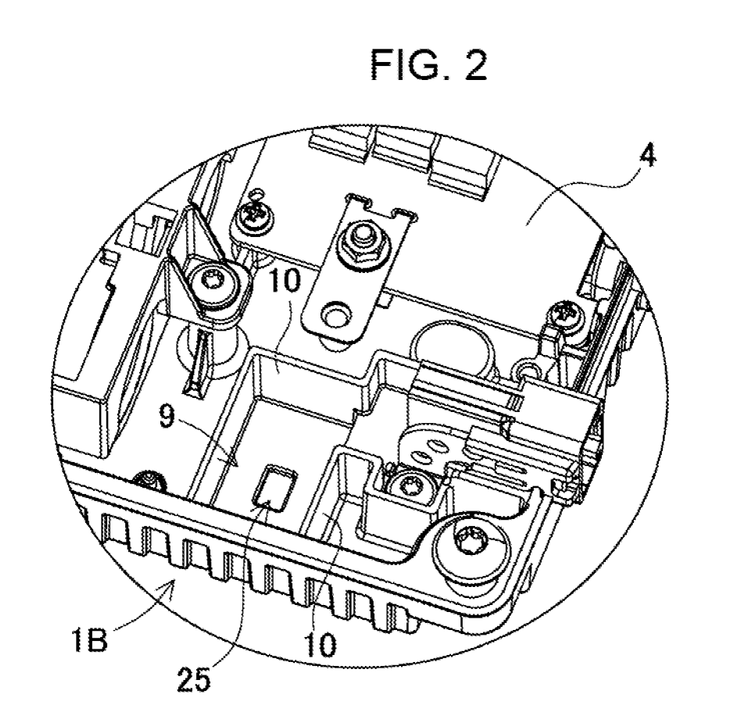
FIG. 2 is a perspective view of a lower case and a cradle in the battery system depicted in FIG. 1.
Figure 3:
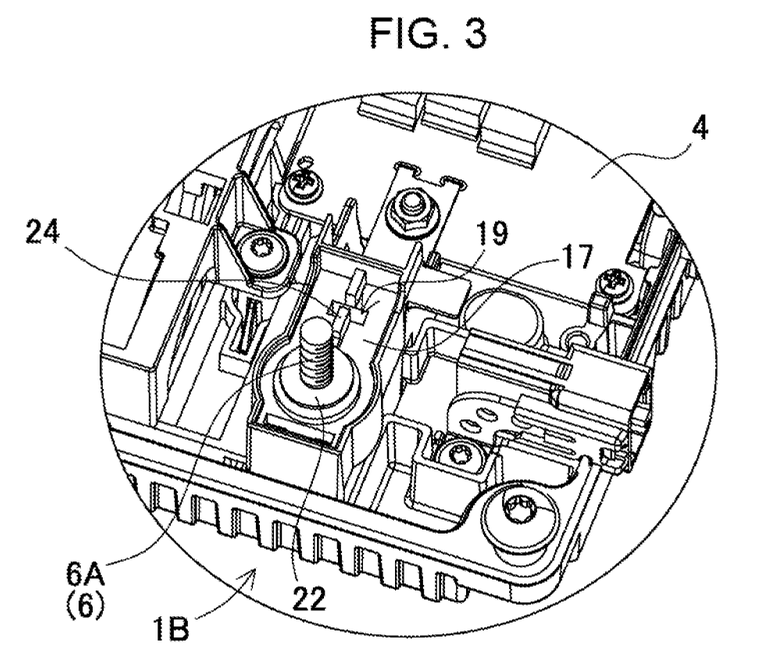
FIG. 3 is another perspective view of the lower case and the cradle in the battery system depicted in FIG. 1.
Figure 4:
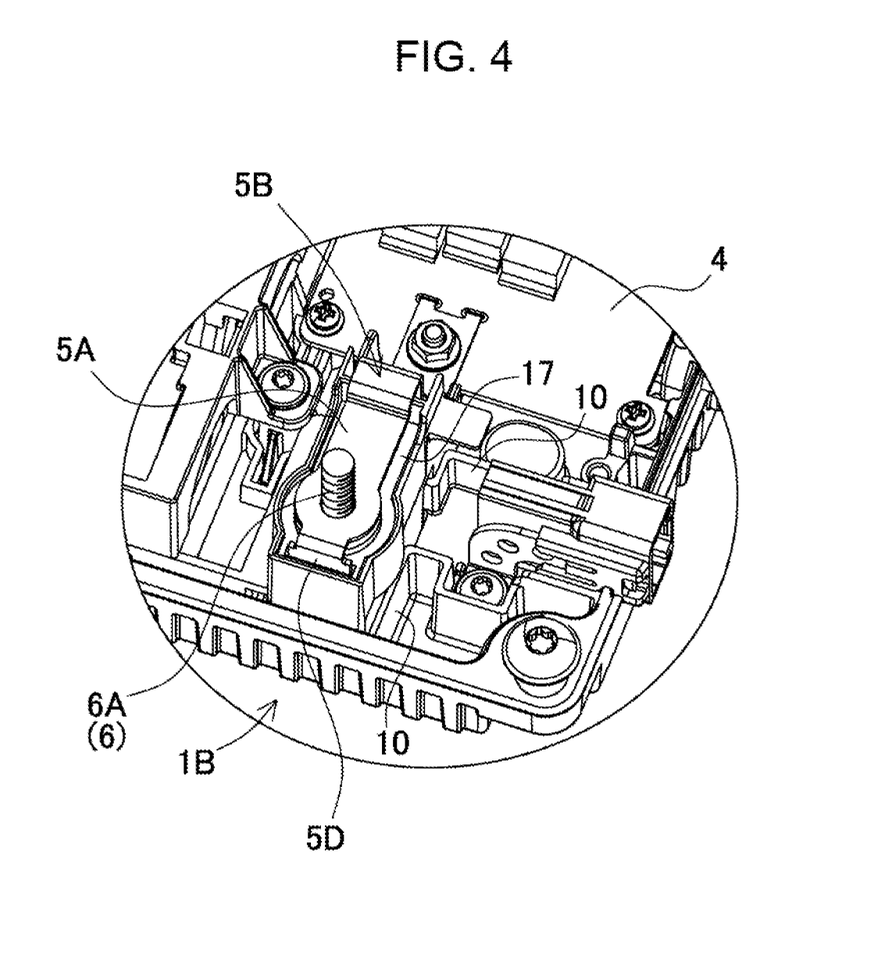
FIG. 4 is still another perspective view of the lower case and the cradle in the battery system depicted in FIG. 1.
Figure 5:
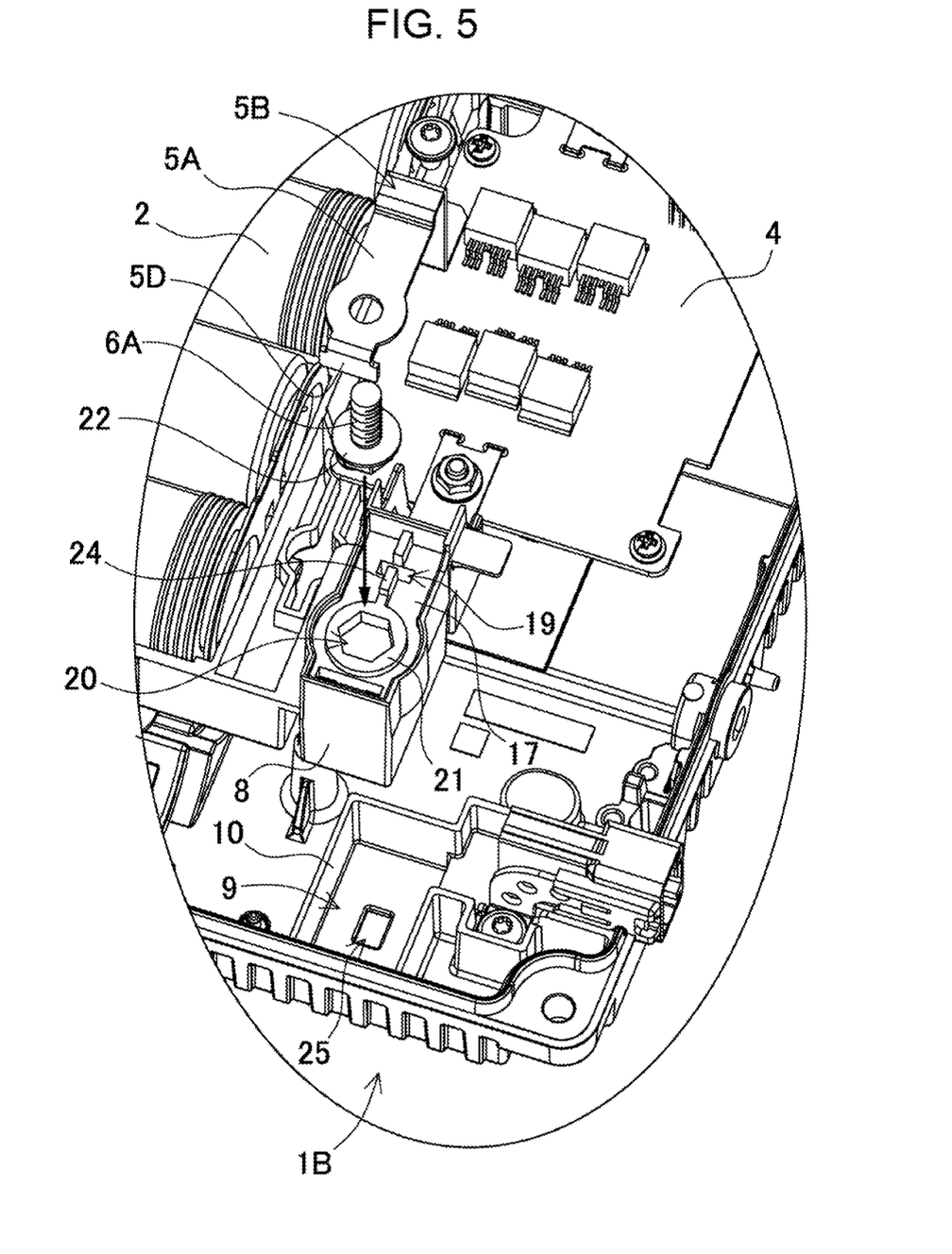
FIG. 5 is an exploded perspective view of the lower case and the cradle in the battery system depicted in FIG. 1.
Figure 6:
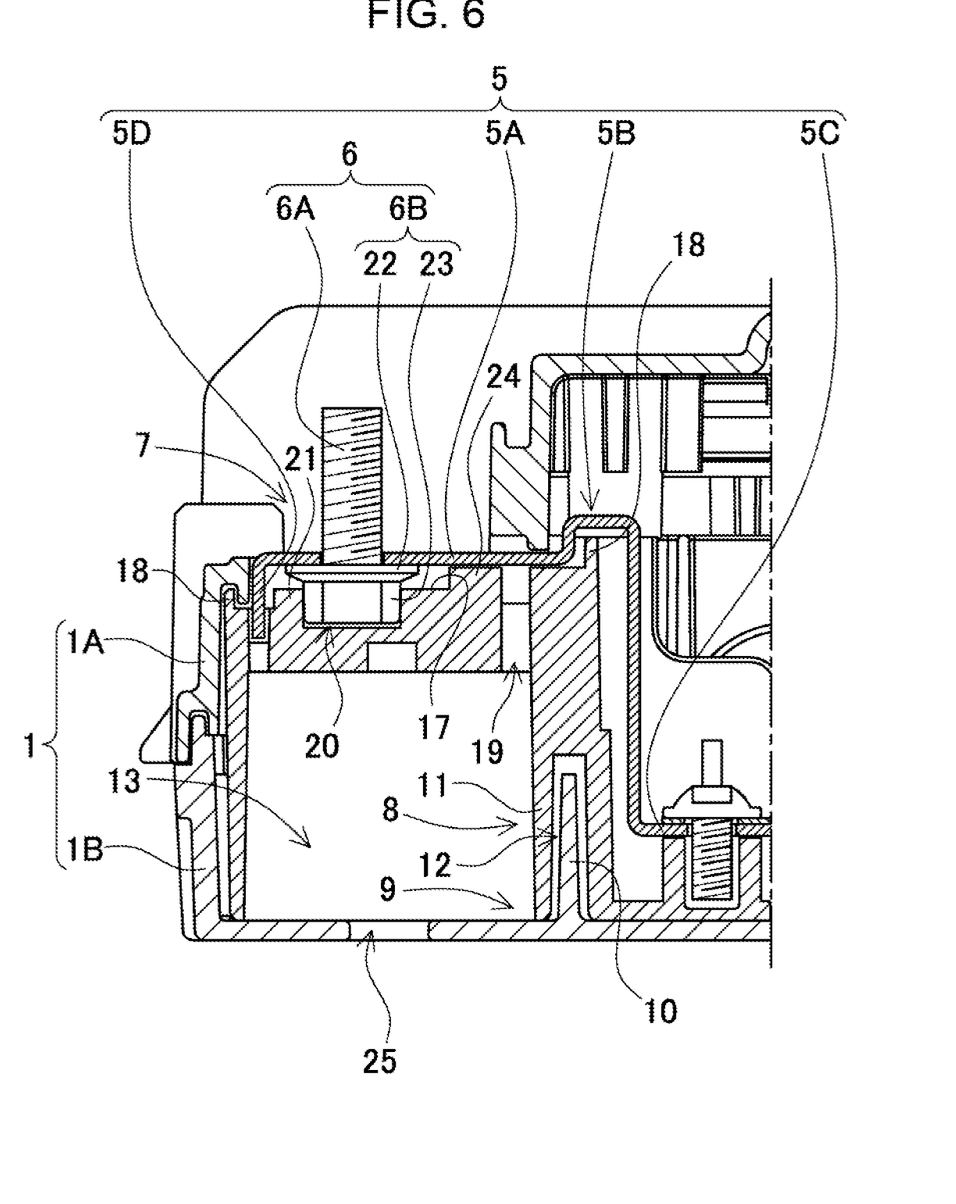
FIG. 6 is a partial sectional view depicting a coupling portion among the lower case, an upper case, and the cradle in the battery system depicted in FIG. 1.
Figure 7:
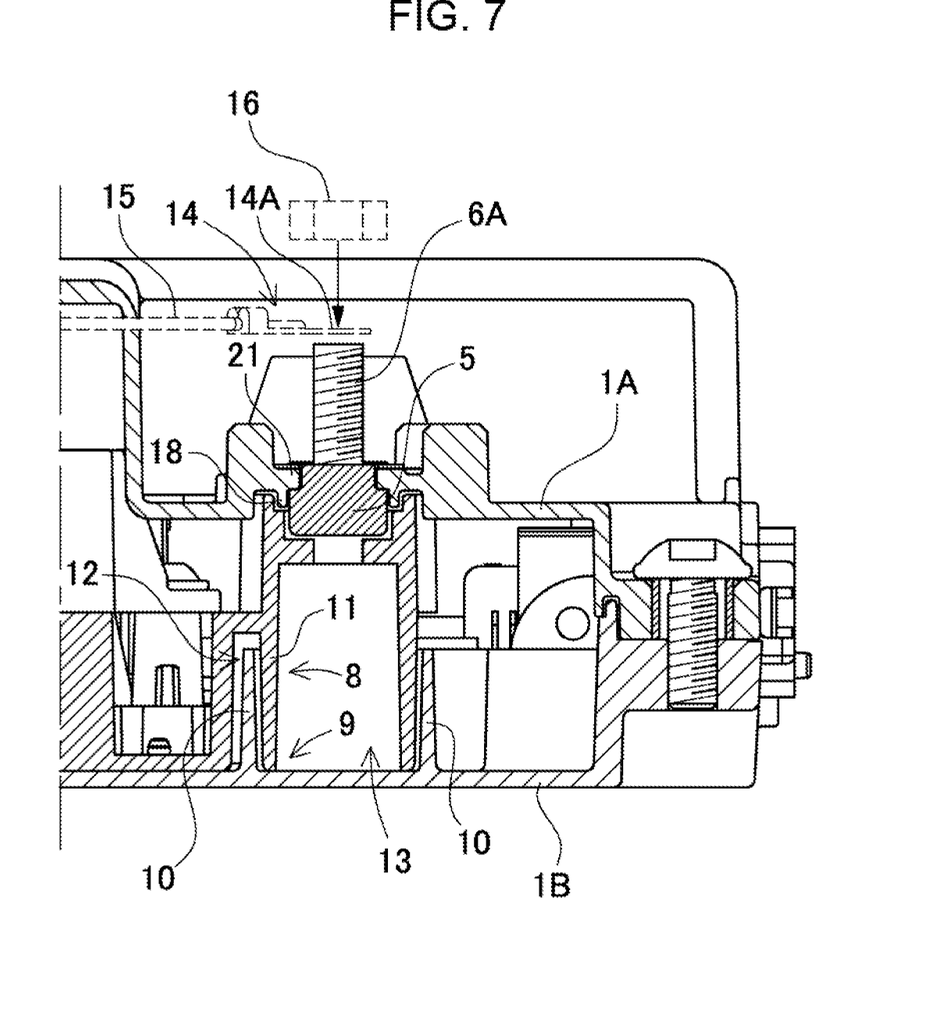
FIG. 7 is another partial sectional view depicting the coupling portion among the lower case, the upper case, and the cradle in the battery system depicted in FIG. 1.

An entire exploded perspective view in FIG. 1, perspective views in FIG. 2 to FIG. 4, an exploded perspective view in FIG. 5, and sectional views in FIG. 6 and FIG. 7 depict a battery system including outer case 1 being closed but not being sealed, secondary batteries 2, battery holder 3 disposing secondary batteries 2 at fixed positions, and circuit board 4 mounting electronic components achieving a protection circuit or the like for secondary batteries 2.

These drawings each depict the battery system parallelly connected to the electrical equipment battery. This battery system includes secondary batteries 2 each embodied by a nickel hydride battery. Secondary batteries 2 may alternatively be embodied by any currently used secondary batteries like lithium ion secondary batteries, or any other secondary batteries to be developed. The battery system depicted in these drawings is parallelly connected to the electrical equipment battery, and accordingly includes ten secondary batteries 2 embodied by nickel hydride batteries and disposed at the fixed positions by battery holder 3. Ten secondary batteries 2 are connected in series to have a rated voltage of 12 V of a lead battery.

The battery system depicted in FIG. 1 to FIG. 7 has the waterproof structure that is not achieved by sealing outer case 1 but by preventing harmful effects of water entering outer case 1 being closed but not being sealed. Outer case 1 includes upper case 1A and lower case 1B coupled to each other. The battery system includes lead plate 5 connected to output ends of secondary batteries 2 and output lead 6 connected to lead plate 5. Lead plate 5 and output lead 6 are exposed at opening 7 provided in outer case 1. According to the exemplary embodiment depicted in FIG. 1 to FIG. 7, upper case 1A is made of a resin whereas lower case 1B is made of a metal. Upper case LA made of a resin achieves reduction in weight of the battery system. Lower case 1B made of a metal cools heat generating members such as secondary batteries 2 and circuit elements accommodated in outer case 1. The upper case and the lower case made of different materials may particularly have thermal expansion with different dimensional change and may not be sealed with use of packing. The following exemplary embodiment provides the waterproof structure not achieved by sealing the outer case with use of packing or the like but stably maintained even in a use environment under a severe external condition of temperature or the like.

Outer case 1 accommodates cradle 8, as well as lead plate 5 and output lead 6 disposed at fixed positions. Lower case 1B has a bottom plate provided with coupling part 9 allowing cradle 8 to be inserted from above and be disposed at a fixed position. Coupling part 9 is surrounded with waterproof wall 10 to which cradle 8 is fitted to be coupled and disposed at the fixed position. Waterproof wall 10 rises vertically from the bottom plate of lower case 1B, and disposes cradle 8 having a vertical posture. Cradle 8 has a lower end provided with insertion cylinder 11 (=insertion pipe) inserted to inside waterproof wall 10. Insertion cylinder 11 has a vertical wall partially provided with fitting groove 12 opened downward and configured to fit waterproof wall 10. Cradle 8 is coupled to lower case 1B and is disposed at the fixed position when insertion cylinder 11 is inserted to inside waterproof wall 10 and waterproof wall 10 is partially inserted to fitting groove 12.

As depicted in the sectional views in FIG. 6 and FIG. 7, cradle 8 is interposed or sandwiched between lower case 1B and upper case 1A of outer case 1 to be disposed at the fixed position. Waterproof wall 10 also serves as a partition wall preventing entering water flowing downward from drainage channel 13 provided in cradle 8 from externally leaking from lower case 1B.

Lead plate 5 and output lead 6 are connected to lead wire 15 via a round terminal of connection terminal 14 indicated by a chain line in FIG. 7. In such a connection structure, rod 6A of output lead 6 is inserted to round terminal 14A of connection terminal 14, nut 16 is screwed to a male thread of rod 6A, round terminal 14A is pinched between lead plate 5 and nut 16, and connection terminal 14 is thus connected to lead plate 5. Output lead 6 serves as an output terminal and is connected to connection terminal 14 layered on lead plate 5 in this connection structure. However, the present invention does not limit the output lead to the output terminal. The output lead may alternatively serve as a lead wire to be externally led and be connected to lead plate 5 by soldering or welding. As depicted, connection terminal 14 may still alternatively be connected to the output lead without being connected to lead plate 5.

Lead plate 5 is provided on cradle 8 in outer case 1 to be disposed at the fixed position. As depicted in the perspective view in FIG. 2 and the partial sectional views in FIG. 6 and FIG. 7, lower case 1B of outer case 1 disposes cradle 8 at the fixed position. FIG. 6 is a horizontal sectional view of lead plate 5, whereas FIG. 7 is a sectional view in a front-back direction of lead plate 5. Lower case 1B according to the above exemplary embodiment is made of a metal. In another case where lower case 1B is made of a resin, cradle 8 and lower case 1B may be integrally made of an insulating plastic material.

Cradle 8 is made of an insulating plastic material and is molded integrally. Cradle 8 depicted in the sectional views in FIG. 6 and FIG. 7 includes upper plate 17 allowing lead plate 5 to be disposed on upper plate 17, peripheral wall 18 surrounding upper plate 17, drainage holes 19 opened in upper plate 17, and drainage channel 13 for entering water flowing into drainage holes 19.

Upper plate 17 has an upper surface provided with fitting recess 20 to allow output lead 6 to be fitted. Fitting recess 20 has an inner shape guiding flange 6B provided at a lower end of output lead 6, and guides flange 6B to unrotatably hold output lead 6 in a vertical posture. Fitting recess 20 guiding flange 6B having a hexagonal head has a hexagonal inner shape to unrotatably fit flange 6B having the hexagonal head. Fitting recess 20 unrotatably guides flange 6B of output lead 6, so that output lead 6 does not rotate when nut 16 is screwed to rod 6A of output lead 6 and connection terminal 14 can be easily coupled to output lead 6. Such a fitting structure of guiding and unrotatably holding flange 6B to fitting recess 20 can be achieved by forming flange 6B into a noncircular shape such as an elliptical shape or a polygonal shape and forming fitting recess 20 to have a noncircular inner shape to unrotatably guide.

Upper plate 17 depicted in FIG. 5 to FIG. 7 is provided with projecting strip 21 surrounding fitting recess 20. Flange 6B having the hexagonal head of output lead 6 includes hexagonal prism 23 (=hexagonal pillar) having a hexagonal outer shape and disc 22 having a circular outer shape integrated with hexagonal prism 23. Disc 22 is disposed on an upper surface of projecting strip 21 and hexagonal prism 23 is unrotatably guided to fitting recess 20. With output lead 6 thus configured, connection terminal 14 and lead plate 5 are pinched between nut 16 screwed to rod 6A and disc 22 to reliably connect connection terminal 14 to output lead 6.

Upper plate 17 depicted in FIG. 5 to FIG. 7 has projections 24 pushing upward a lower surface of lead plate 5 to provide a waterflow gap between lead plate 5 and upper plate 17. Projection 24 is flush with an upper surface of flange 6B of output lead 6, and disposes lead plate 5 on flange 6B of output lead 6 and projection 24 to provide the waterflow gap between lead plate 5 and upper plate 17. Upper plate 17 depicted radially extends from circular projecting strip 21 surrounding fitting recess 20, and has two sets of projections 24 disposed in a single row longitudinally extending in a center of upper plate 17.

Peripheral wall 18 is provided around upper plate 17 and is disposed around lead plate 5 set on upper plate 17. In other words, lead plate 5 is fitted inside peripheral wall 18 to be inhibited from horizontally displacing. Peripheral wall 18 disposes lead plate 5 at the fixed position and inhibits water flowing in from opening 7 of outer case 1 from externally leaking upper plate 17. Peripheral wall 18 having larger height reliably inhibits leakage of water, and is thus preferred to have at least 1 mm, more preferred to have at least 2 mm, and still further preferred to have at least 2.5 mm in height.

Drainage holes 19 are opened inside peripheral wall 18 to drain, into cradle 8, water entering an exposed portion of lead plate 5 from opening 7 of outer case 1. Cradle 8 depicted is provided with two drainage holes 19. First one of drainage holes 19 receives bent part 5D of lead plate 5, whereas second one of drainage holes 19 is disposed between the two sets of projections 24 on a rear surface of lead plate 5. First drainage hole 19 receiving bent part 5D of lead plate 5 allows water flowing along lead plate 5 to smoothly flow into cradle 8, whereas second drainage hole 19 disposed between projections 24 on the rear surface of lead plate 5 allows water flowing to the rear surface of lead plate 5 to smoothly flow into cradle 8.

Cradle 8 has a hollow shape such that drainage channel 13 is provided inside cradle 8. Drainage channel 13 drains, from a lower end opening, entering water flowing from drainage hole 19 opened in upper plate 17. Entering water drained out of drainage channel 13 is externally drained from drainage opening 25 provided in the bottom plate of outer case 1. Drainage opening 25 is disposed inside waterproof wall 10 and externally drains, without leaking into outer case 1, entering water flowing out of drainage channel 13 in cradle 8.

Lead plate 5 is a metal plate having a predetermined belt shape, and includes planar part 5A disposed inside peripheral wall 18 on upper plate 17, rising part 5B bent to be provided continuously from planar part 5A and shaped to cross over peripheral wall 18, and connecting part 5C provided outside rising part 5B and connected to circuit board 4 as depicted. Rising part 5B of lead plate 5 depicted in FIG. 4 has a portion that is penetrated by rod 6A of output lead 6 and is equally shaped to an outer shape of round terminal 14A of connection terminal 14 or is made larger than round terminal 14A so as to increase a contact area with round terminal 14A and decrease contact resistance with connection terminal 14. Connecting part 5C of lead plate 5 is connected to the circuit board to be connected to the output ends of secondary batteries 2 via the circuit board.

The battery system depicted in FIG. 1 includes two circuit boards, namely, a first circuit board and a second circuit board. The first circuit board is fixed to a surface of battery holder 3, whereas the second circuit board is fixed to outer case 1. The first circuit board mounts a circuit configured to calculate voltage, current, remaining capacity, or the like of secondary batteries 2, and the second circuit board mounts a semiconductor power switch such as a power metal-oxide semiconductor field-effect transistor (MOSFET) connected to the output ends of secondary batteries 2 and configured to turn ON and Off current for charge and discharge. Lead plate 5 is connected to the output ends of secondary batteries 2 via the semiconductor power switch.

INDUSTRIAL APPLICABILITY

The present invention is effectively applicable to a battery system having a waterproof structure and including outer case 1 incorporating a wire harness.

The invention claimed is:

1. A battery system having a waterproof structure, the battery system comprising:
    an outer case being closed but not being sealed;
    a secondary battery disposed in the outer case;
    a lead plate provided in the outer case and connected to an output end of the secondary battery; and
    an output lead that has a first end connected to the lead plate and is exposed to outside from an opening of the outer case,
    wherein
    the outer case accommodates a cradle for the lead plate, wherein the lead plate is disposed on the cradle,
    the cradle includes an upper plate allowing the lead plate to be disposed on the upper plate, a peripheral wall provided around the upper plate, a plurality of drainage holes, opened in the upper plate, and a drainage channel for entering water flowing into the plurality of drainage holes, wherein each of the plurality of drainage holes is a through-hole communicating with the drainage channel,
    the outer case has a drainage opening allowing entering water drained out of the drainage channel of the cradle to be externally drained,
    the lead plate has a planar part disposed on the upper plate of the cradle and inside the peripheral wall, and a rising part provided continuously from the planar part and shaped to cross over the peripheral wall,
    the lead plate includes a bent part,
    the plurality of drainage holes include a first hole into which the bent part of the lead plate is inserted, and a second hole disposed facing a bottom surface of the lead plate,
    the second hole is located between the first hole and the rising part, and
    entering water flowing through the opening flows from the plurality of drainage holes and passes through the drainage channel to be externally drained from the drainage opening of the outer case.

2. The battery system having the waterproof structure according to claim 1, wherein
    the outer case includes an upper case exposing the output lead, and a lower case coupled to the upper case, and
    the lower case has a coupling part disposing the cradle at a fixed position, the coupling part has a bottom surface provided with the drainage opening, and the drainage opening is surrounded with a waterproof wall.

3. The battery system having the waterproof structure according to claim 1, wherein
    the lead plate has an insertion hole,
    the output lead includes a rod inserted into the insertion hole of the lead plate and a flange provided at a lower end of the rod,
    and
    the lead plate is disposed on the flange to be connected to the output lead.

4. The battery system having the waterproof structure according to claim 3, wherein
    the flange has a noncircular outer shape as a polygonal shape or an elliptical shape,
    the cradle has a fitting recess unrotatably guiding the flange having the noncircular shape,
    the rod has a surface provided with a screw having a male thread, and
    the screw receives a nut connecting a lead wire to the output lead.

5. The battery system having the waterproof structure according to claim 1, wherein
    the lead plate is an elongated metal plate having a distal end provided with the bent part and an intermediate portion provided with the rising part,
    the lead plate has a rear end provided behind the rising part and connected to the output end of the secondary battery.

6. The battery system having the waterproof structure according to claim 4, wherein
    the lead plate is an elongated metal plate having a distal end provided with the bent part and an intermediate portion provided with the rising part,
    the lead plate has a rear end provided behind the rising part and connected to the output end of the secondary battery.

7. The battery system having the waterproof structure according to claim 1, further including a pair of projections extending from the upper plate upward toward the lead plate so as to define a gap between the lead plate and the upper plate,
    wherein the second hole is interposed between the pair of projections.

* * * * *